United States Patent [19]

Lelm

[11] Patent Number: 5,459,855
[45] Date of Patent: Oct. 17, 1995

[54] FREQUENCY RATIO DETECTOR FOR DETERMINING FIXED FREQUENCY RATIOS IN A COMPUTER SYSTEM

[75] Inventor: Charles A. Lelm, Fort Collins, Colo.

[73] Assignee: Hewlett-Packard Company, Palo Alto, Calif.

[21] Appl. No.: 927,754

[22] Filed: Aug. 10, 1992

[51] Int. Cl.⁶ .................................................. G06F 1/04
[52] U.S. Cl. ........................... 395/550; 364/DIG. 1; 364/270; 364/270.4; 364/271; 364/271.4; 364/271.9
[58] Field of Search .................................. 395/550, 800, 395/775; 307/525, 526, 527, 528

[56] References Cited

U.S. PATENT DOCUMENTS

| | | | |
|---|---|---|---|
| 3,599,014 | 8/1971 | Carp | 307/233 |
| 3,708,686 | 1/1973 | Butler, Jr. et al. | 307/149 |
| 4,001,816 | 1/1977 | Yamada et al. | 340/389 E |
| 4,114,045 | 9/1978 | Shina | 250/569 |
| 4,454,531 | 6/1984 | Elmis et al. | 358/17 |
| 4,504,862 | 3/1985 | Achtstaetter | 358/158 |
| 4,509,072 | 4/1985 | Elmis et al. | 358/17 |
| 4,619,174 | 10/1986 | Okumura | 84/1.01 |
| 4,699,518 | 10/1987 | Tanabe | 368/75 |
| 4,857,866 | 8/1989 | Tateishi | 331/1 A |
| 4,980,545 | 12/1990 | Seki et al. | 250/241 P |
| 4,984,254 | 1/1991 | Thomas | 375/106 |
| 5,086,500 | 2/1992 | Greub | 395/550 |
| 5,107,220 | 4/1992 | Andoh | 328/14 |
| 5,133,064 | 7/1992 | Hotta et al. | 395/550 |
| 5,146,601 | 9/1992 | Hosaka et al. | 395/800 |
| 5,274,796 | 12/1993 | Conner | 395/550 |
| 5,301,306 | 4/1994 | Plog | 395/550 |
| 5,319,771 | 6/1994 | Takeda | 395/550 |

OTHER PUBLICATIONS

Eric Delano, Will Walter, Jeff Yetter, Mark Forsyth, *A High Speed Superscalar PA-RISC Processor*, Proceedings of the Compcon Spring 1992, Digest of Papers, San Francisco, Calif., Feb. 24–28, 1992, pp. 116–121.

Intel, "Intel 82347 Power Management PC Peripheral", pp. 1–30 (Preliminary, May 1990).

Primary Examiner—Christopher B. Shin
Assistant Examiner—Lance L. Barry

[57] ABSTRACT

A system and method is disclosed for determining the clock frequency ratio between a CPU clock and a "secondary clock," where the secondary clock controls one or more operations external to the CPU. The present invention is configured to function with a CPU which can operate interchangeably at one of two or more possible clock frequency ratios. In a preferred embodiment, a system clock generator outputs a signal SYNCH which has a frequency equal to the frequency of the secondary clock divided by an integer N. Signal CK2, having the same frequency as the CPU clock, and SYNCH, are input to a frequency ratio detector. The frequency ratio detector determines the clock frequency ratio between the CPU clock and the secondary clock, where this ratio can be only one of a discrete number of fixed values. The frequency ratio detector outputs one or more MODE bits which indicate the clock frequency ratio detected. The MODE bits are used by the CPU synchronization logic for generating the timing signals necessary for interfacing with hardware controlled by the secondary clock.

9 Claims, 6 Drawing Sheets

CPU CLOCK : SECONDARY CLOCK = 1:1

SECONDARY CLOCK

SYNCH

CK2

FRD STATE     B   C   F   G

CPU CLOCK : SECONDARY CLOCK = 3:2

SECONDARY CLOCK

SYNCH

CK2

FRD STATE     B   C   D   F   G   H

CPU CLOCK : SECONDARY CLOCK = 2:1

SECONDARY CLOCK

SYNCH

CK2

FRD STATE     B   C   D   E   F   G   H   A

5,459,855

FREQUENCY RATIO DETECTOR FOR DETERMINING FIXED FREQUENCY RATIOS IN A COMPUTER SYSTEM

BACKGROUND OF THE INVENTION

1. Field of the Invention

The present invention relates generally to computer based systems that employ multiple clocks which potentially differ in frequency. More particularly, the present invention relates to a system and method for determining the ratio between the frequencies of a CPU clock and a clock used to control other hardware within a computer system.

2. Related Art

Conventional computer systems generally use one or more clocks of a single frequency to control operations performed by the central processing unit (CPU), and to control operations which occur external to the CPU. External operations involve accesses by the CPU (and other devices) to components that are external to the CPU, such as memory arrays, peripheral devices, and other integrated circuits. In systems which use a single clock frequency, the operating speed of the CPU is limited by the speed of the devices connected to it. This operating speed limitation can significantly impede performance, since modern CPUs can commonly operate at clock rates considerably higher than is tolerable by existing peripheral devices.

A solution to this problem has been to use a fast CPU clock to control the operations by the CPU, while using a slower "secondary clock" to control certain operations external to the CPU. For example, a system might use a 100 megahertz (MHz) clock to control operations internal to the CPU, and a 50 MHz secondary clock to control all accesses on a system bus which is connected to the CPU. One advantage of such a system is the ability to potentially operate the CPU at close to its maximum speed. Thus, CPU operations which are not limited by the speed of external devices can be executed more rapidly than would be possible if a single clock frequency were used. A second advantage is the ability to upgrade to a faster CPU without having to replace the entire computer system.

Systems have also been designed to allow the CPU to be set to operate at one of two or more fixed ratios between the two clock frequencies. For example, a CPU system might be designed so that the "clock frequency ratio," defined as the ratio between the CPU clock frequency and the secondary clock frequency, can be set at 1:1, 2:1, and 3:1. Such designs allow the CPU clock frequency to be selected according to the particular configuration of the computer system.

The difficulty in designing this type of system has been the complexity of the synchronization logic required to interface the CPU with the components which operate at the slower speed. Most systems to date, therefore, essentially avoid this problem by only using a single clock frequency ratio of C:1, where C is an integer. Since this limitation requires the CPU frequency to be an integer multiple of the secondary clock frequency, it often prevents the CPU from being clocked at a close to its maximum speed.

Existing systems which employ synchronization logic additionally have the disadvantage of requiring a special clock buffer to receive the secondary clock. This clock buffer resides on the chip performing the synchronization function, which is often the CPU chip.

What is needed, therefore, is a system which will enable a computer system to be switched between two or more fixed clock frequency ratios, including ratios which fall between C:1 (for two consecutive integers C). It is desirable to design this system such that complex synchronization logic is not required. Additionally, it is desirable to design the system without running the secondary clock to the chip containing the synchronization logic.

SUMMARY OF THE INVENTION

The present invention is directed to a system and method for determining the clock frequency ratio between a CPU clock and a "secondary clock," where the secondary clock controls one or more operations external to the CPU. The present invention is configured to function with a CPU which can operate interchangeably at one of two or more possible clock frequency ratios.

In the preferred embodiment, a system clock generator outputs a signal SYNCH which has a frequency equal to the secondary clock frequency divided by an integer N. Signal CK2, having the same frequency as the CPU clock, and SYNCH, are input to a frequency ratio detector. The frequency ratio detector determines the clock frequency ratio between the CPU clock and the secondary clock, where this ratio can be only one of a discrete number of possible values. The frequency ratio detector outputs one or more MODE bits which indicate the clock frequency ratio detected. The MODE bits are used by the CPU synchronization logic for generating the timing signals necessary for interfacing with hardware controlled by the secondary clock.

The frequency ratio detector determines the clock frequency ratio by counting the number of transitions by CK2 while SYNCH remains at a single logic level. The integer N used to generate SYNCH is therefore selected such that each expected clock frequency ratio can be uniquely determined from the counted number transitions.

The present invention greatly simplifies the task of synchronizing the CPU with hardware controlled by the secondary clock, by providing a simple mechanism for detecting the clock frequency ratio. The clock frequency ratio is detected in a maximum of four CPU clock cycles, without bringing the secondary clock onto the chip which detects the clock frequency ratio. Thus, the need for extra clock buffering circuitry is avoided.

Further features and advantages of the present invention, as well as the structure and operation of various embodiments of the present invention, are described in detail below with reference to the accompanying drawings.

BRIEF DESCRIPTION OF THE DRAWINGS

In the drawings, like reference numbers indicate identical or functionally similar elements. Additionally, the left-most digit of a reference number identifies the drawing in which the reference number first appears.

DETAILED DESCRIPTION OF THE INVENTION

1. Overview

The present invention is directed to a computer system which uses a CPU clock to control the operation of the CPU, and a secondary clock to control hardware to which the CPU is interfaced. The CPU is designed to operate interchangeably at two or more fixed clock frequency ratios, where the clock frequency ratio is the ratio between the frequencies of the CPU clock and the secondary clock. A frequency ratio detector detects the fixed clock frequency ratio, and transmits this information to the CPU. One embodiment of the present invention is included, which detects clock frequency ratios of 1:1, 3:2, and 2:1.

2. System Environment

Figure 1:
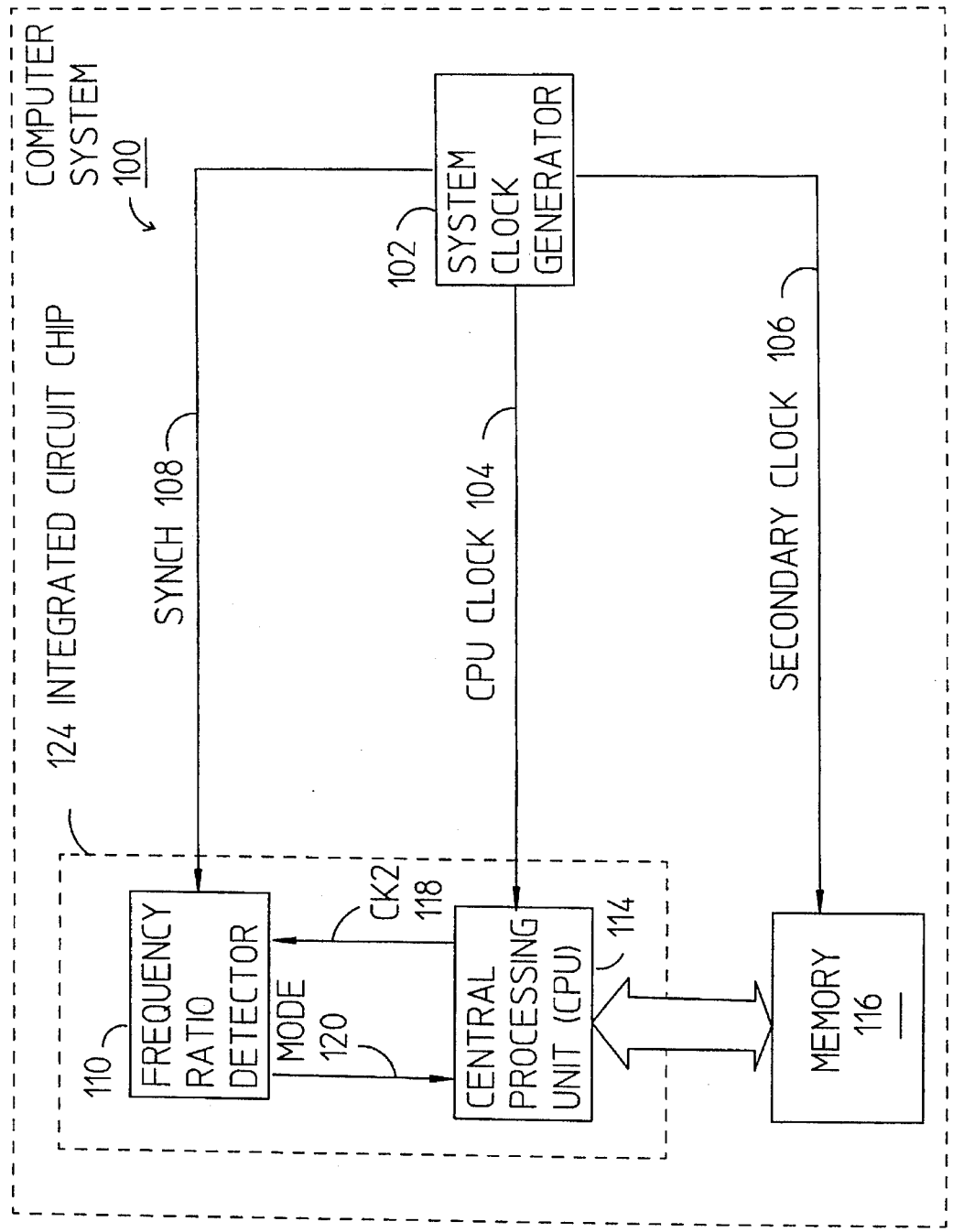
FIG. 1 is a block diagram of a computer system in which the invention operates.

FIG. 1 illustrates a computer system 100 which incorporates a preferred embodiment of the present invention. The computer system 100 uses a CPU 114 that can be switched between two or more fixed clock frequency ratios. The operation of the CPU 114 is controlled by a CPU clock 104. The CPU 114 uses synchronization logic (not shown), which generates the timing signals on the bus 122 necessary for accessing memory 116. Memory 116 is controlled by a secondary clock 106. The operation of the synchronization logic depends on the clock frequency ratio being used, which is detected by a frequency ratio detector (FRD) 110.

A system clock generator 102 generates the CPU Clock 104 and the secondary clock 106. Each clock 104, 106 may consist of a plurality of complimentary pairs of differential signals of the same frequency, as is commonly the case. However, for purposes of this description, it may be assumed that each clock logically consists of a single signal.

The system clock generator 102 additionally generates a signal SYNCH 108, which has a frequency equal to the secondary clock frequency divided by an integer N. The system clock generator 102 can generate SYNCH 108 using a simple frequency divider circuit. Frequency divider circuits are commonly employed by existing systems. In the preferred embodiment, the frequency of SYNCH 108 is one-fourth the frequency of the secondary clock 106, and has a duty cycle of 50 percent. This definition of SYNCH 108 greatly simplifies the logic needed to determine the clock frequency ratio.

The CPU 114 generates an output signal CK2 118, which is equal in frequency to the CPU clock 104. The FRD 110 uses CK2 118 and SYNCH 108 to determine the clock frequency ratio. The use of SYNCH 108 to determine the clock frequency ratio, rather than the secondary clock 106, eliminates the need to include clock buffering circuitry on the chip containing the FRD 110.

In the preferred embodiment, the FRD 110 and the CPU 114 reside on a single integrated circuit chip 124. However, it should be understood that the FRD 110 and CPU 114 may reside on separate chips.

The detected clock frequency ratio is transmitted from the FRD 110 to the CPU 114 using a signal MODE 120. MODE 120 consists of one or more bits, with the number of bits depending on the number of fixed frequency ratios which may be detected by the FRD 110. In the preferred embodiment, the FRD 110 can detect three clock frequency ratios, and generates two MODE 120 bits. The detectable ratios are 1:1, 3:2, and 2:1, and are indicated by the binary MODE 120 values of $00_2$, $01_2$ and $11_2$, respectively.

Although the secondary clock 106 is shown in FIG. 1 as controlling memory 116, it should be understood that the secondary clock may be any clock which controls hardware to which the CPU 114 is interfaced. Additionally, although SYNCH 108 has a frequency of one-fourth the frequency of the secondary clock 106 in the preferred embodiment, SYNCH 108 can have any frequency which will allow the FRD 110 to uniquely determine all fixed ratios. Finally, it should be noted that in an alternate embodiment, signal CK2 118 can be eliminated and the CPU clock 104 can be connected directly to the FRD 110.

3. Structure and Operation of the Frequency Ratio Detector

The remaining discussion pertains to the preferred embodiment of the FRD 110. The signals shown in FIG. 1 are referred to throughout the discussion.

Figure 2A:
FIG. 2A is a timing diagram for a clock frequency ratio of 1:1.
Figure 2A:
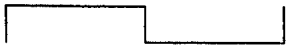
Figure 2A:
Figure 2B:
FIG. 2B is a timing diagram for a clock frequency ratio of 3:2.
Figure 2B:
Figure 2B:
Figure 2C:
FIG. 2C is a timing diagram for a clock frequency ratio of 2:1.
Figure 2C:
Figure 2C:

FIGS. 2A–C are timing diagrams showing the waveforms of the secondary clock 106, SYNCH 108, and CK2 118 for clock frequency ratios of 1:1, 3:2, and 2:1, respectively. As noted above, the frequency of SYNCH 108 is one-fourth the frequency of the secondary clock 106. Individual states, designated by letters A through H, are shown below each timing diagram following each rising edge of CK2 118. These states correspond to individual states of a state machine diagram shown in FIG. 3. The state machine diagram represents the operation of the FRD 110, and is discussed in detail below.

The general method used by the FRD 110 for determining the frequency ratio can be described as follows. When SYNCH 108 goes high, the FRD 110 begins counting the number of low-to-high transitions by CK2 118, and continues counting until SYNCH 108 becomes low. If the FRD 110 counts a total of 2 rising edges by CK2 while SYNCH remains high, it indicates that the clock frequency ratio is 1:1. This situation is shown by FIG. 2A. If the FRD counts a total of 3 rising edges by CK2, it indicates that the clock frequency ratio is 3:2. This situation is shown by FIG. 2B. Finally, if the FRD counts 4 rising edges by CK2 118 while SYNCH 108 is high, it indicates that the clock frequency ratio is 2:1. This situation is shown by FIG. 2C.

In FIG. 2A, it can be seen that the FRD 110 can potentially detect the clock frequency ratio of 1:1 upon the transition from state C to state F, since two rising edges have occurred on CK2 118 and SYNCH 108 has transitioned to a low level. Similarly, in FIG. 2B the FRD 110 can detect the clock frequency ratio of 3:2 upon the transition from D to F. Finally, in FIG. 2C, the FRD 110 can detect the clock frequency ratio of 2:1 upon the transition from D to E, since four rising edges by CK2 118 have occurred by this point.

Figure 3:
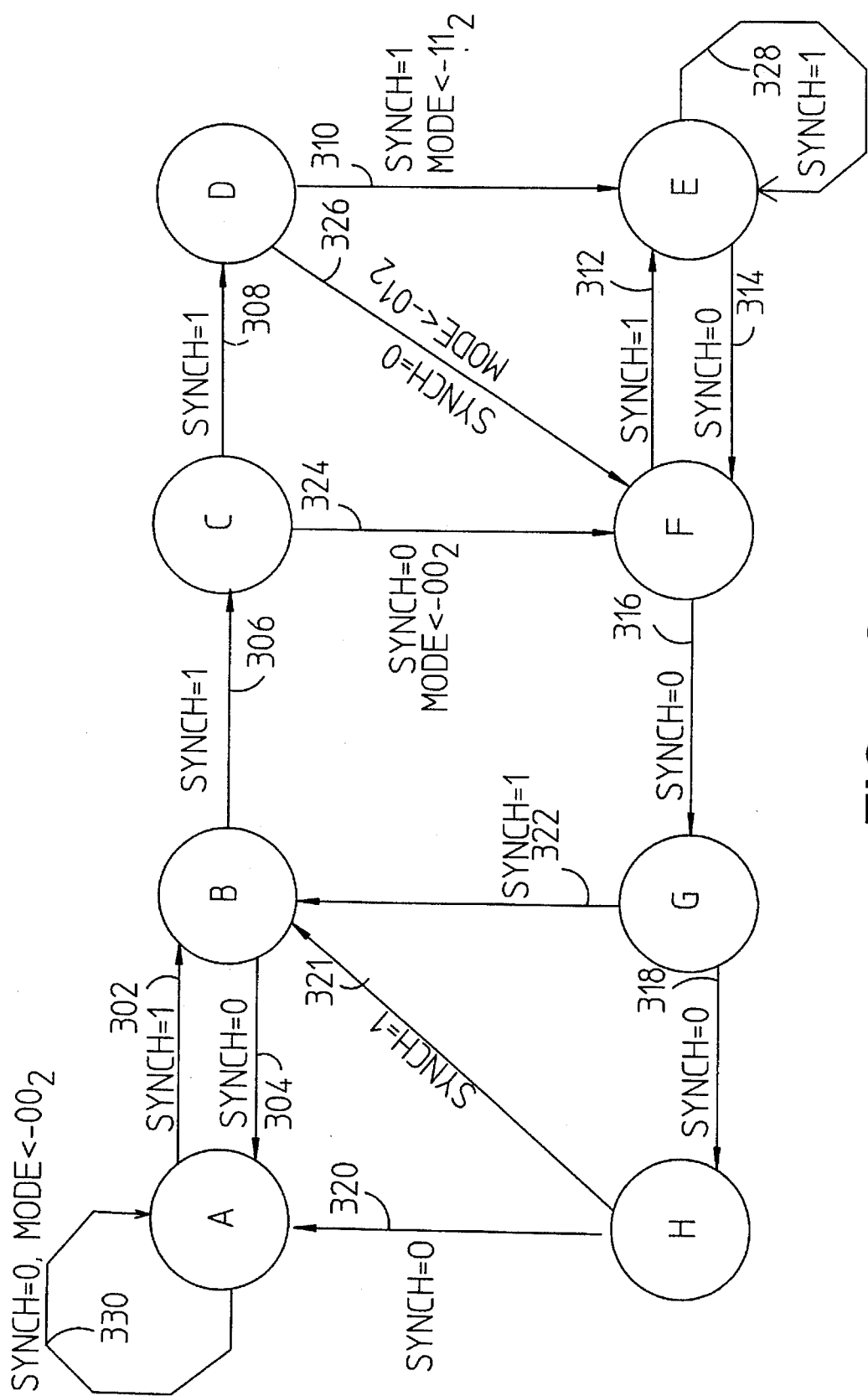
FIG. 3 is a state machine diagram for a frequency ratio detector that can detect ratios of 1:1, 2:1 and 3:2.

FIG. 3 is a state machine diagram which represents the operation of the FRD 110 described above. All transitions between states, represented by arrows, occur on rising edges of CK2 118. The next state in each case depends solely on the present state, and the logic level of SYNCH 108. Table 1 is a state transition table, showing all possible transitions between states for the FRD 110. The information shown in Table 1 is redundant of the information contained in the state machine diagram in FIG. 3. The operation of the state machine is best understood by referring to Table 1, and the corresponding timing diagrams in FIGS. 2A–C.

TABLE 1

STATE TRANSITION TABLE
FOR FREQUENCY RATIO DETECTOR

| Current State | SYNCH 108 | Next State | MODE 120 |
| --- | --- | --- | --- |
| A | 0 | A | $00_2$ |
| A | 1 | B | Unchanged |
| B | 0 | A | Unchanged |
| B | 1 | C | Unchanged |
| C | 0 | F | $00_2$ |
| C | 1 | D | Unchanged |
| D | 0 | F | $01_2$ |
| D | 1 | E | $11_2$ |
| E | 0 | F | Unchanged |
| E | 1 | E | Unchanged |
| F | 0 | G | Unchanged |
| F | 1 | E | Unchanged |
| G | 0 | H | Unchanged |
| G | 1 | B | Unchanged |
| H | 0 | A | Unchanged |
| H | 1 | B | Unchanged |

FIG. 3 illustrates that the FRD 110 updates MODE 120 on certain transitions between states, 310, 324, 326, 330. On transitions from C to F, 324, MODE 120 is updated to a value of $00_2$, indicating a clock frequency ratio of 1:1. Similarly, on transitions from D to F, 326, MODE 120 is updated to $01_2$, indicating a clock frequency ratio of 3:2. Additionally, on transitions from D to E, 310, MODE 120 is updated to $1_{12}$, indicating a clock frequency ratio of 2:1. Finally, on transitions from state A back to state A, 330, MODE 120 is updated to $00_2$, indicating a clock frequency ratio of 1:1. Although it is unnecessary to update MODE 120 on this transition 330, this feature has been added to allow the FRD 110 to be effectively disabled by tying SYNCH 108 low. Thus, a computer system which only operates at a clock frequency ratio of 1:1 can have SYNCH 108 tied to ground, and the FRD 110 will always output a MODE 120 value of $00_2$. On all other transitions between states, MODE 120 remains unchanged.

The operation of the FRD 110 will now be described for 1:1 operation, with reference FIGS. 2A and 3. It is assumed for purposes of illustration that the FRD 110 is initially in state A, and SYNCH 108 has just transitioned to a high logic level. Upon the first rising edge by CK2 118, the FRD 110 transitions from state A to state B, 302, since SYNCH 108 is high. On the second rising edge by CK2 118, the FRD 110 transitions from state B to state C, 306, since SYNCH 108 is high. On the third rising edge by CK2 118, the FRD 110 detects that SYNCH 108 is low, and transitions from state C to state F, 324. Additionally, the FRD 110 sets MODE 120 to $00_2$, indicating a detected clock frequency ratio of 1:1. On the fourth rising edge by CK2 118 the FRD 110 transitions from state F to state G, 316, since SYNCH 108 is low. From this point on, the FRD 110 follows the cyclic sequence B→C→F→G→B→C→F→G ... for as long as the frequency ratio remains 1:1. Similarly, the FRD 110 will continuously repeat the sequence B→C→D→F→G→H upon reaching steady state 3:2 operation, and will repeat the sequence B→C→D→E→F→G→H→A upon reaching steady state 2:1 operation.

The initial state of the FRD 110 can be any of the states A–H, and the FRD 110 must be able to handle changes in the frequency ratio. Therefore, the state machine is designed to eventually reach steady state operation for any initial state, for any of the three clock frequency ratios. For example, if the initial state in the above example is state D, it can be verified that the FRD 110 follows the sequence D→E→E→F before reaching steady state operation. Additionally, it can be verified that for any of the three possible clock frequency ratios and any initial state, the FRD 110 will take a maximum of four CK2 118 rising edges before reaching steady state operation.

Figure 4:
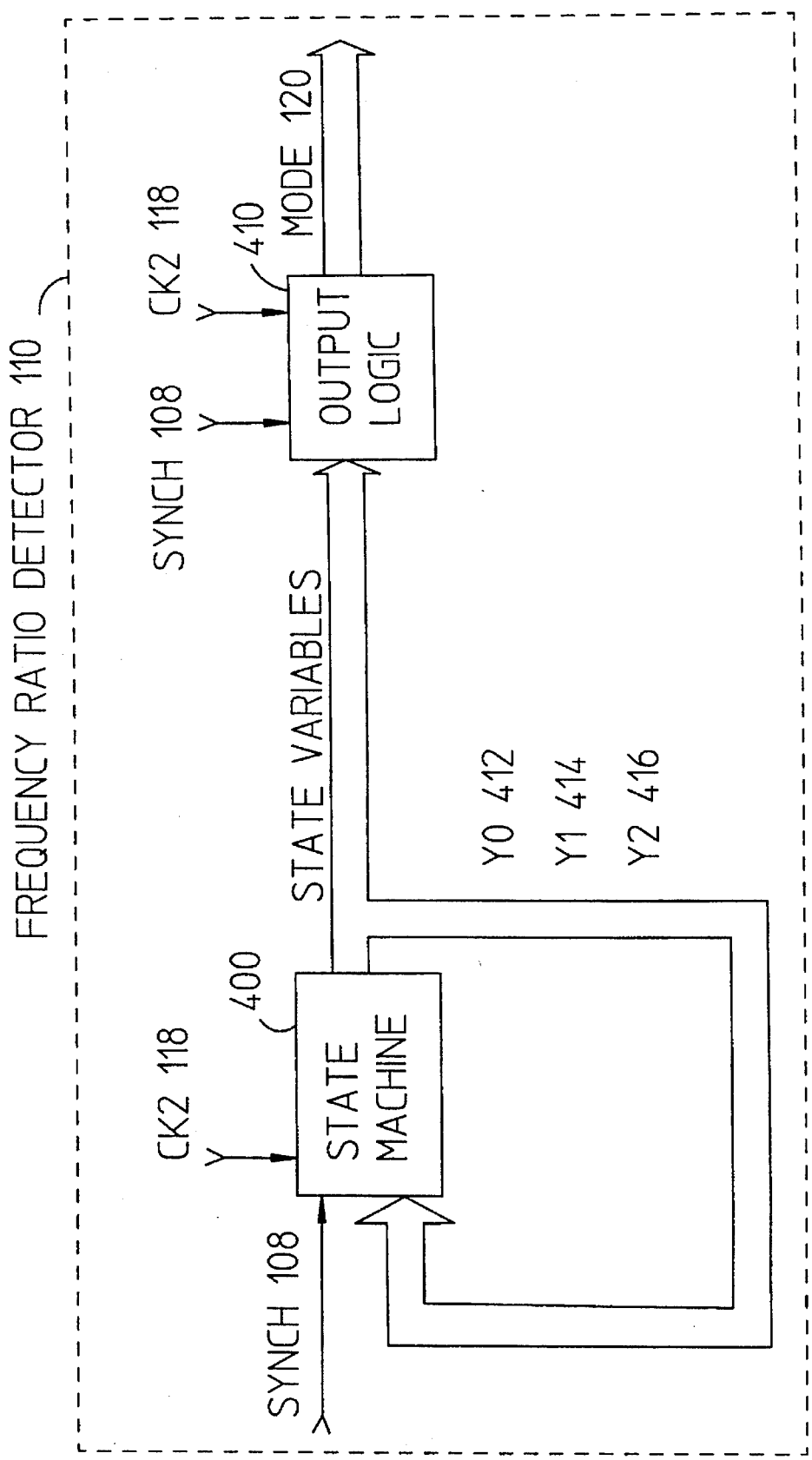
FIG. 4 is a high level block diagram of a frequency ratio detector.

FIG. 4 is a high-level block diagram of the FRD 110. A state machine section 400 of the FRD 110 generates state variables bits Y0 412, Y1 414, and Y2 416, which represent the current state A-H of the FRD 110. The state machine variable bits 412–416 are fed to an output logic section 410 of the FRD 110. The state machine variable bits 412–416 are also fed back to the state machine section 400 as inputs. The state machine section 400 uses these fed-back state variable bits 412–416 for the current CK2 118 cycle, along with SYNCH 108 and CK2 118, to generate the state variable bits 412–416 for the following CK2 118 cycle. Thus, the state of the FRD 110 on the following CK2 118 cycle depends solely on the current state and the level of SYNCH 108. The output logic section 410 of the FRD 110 generates MODE 120 using the state variable bits 412–416, SYNCH 108, and CK2 118.

Figure 5A:
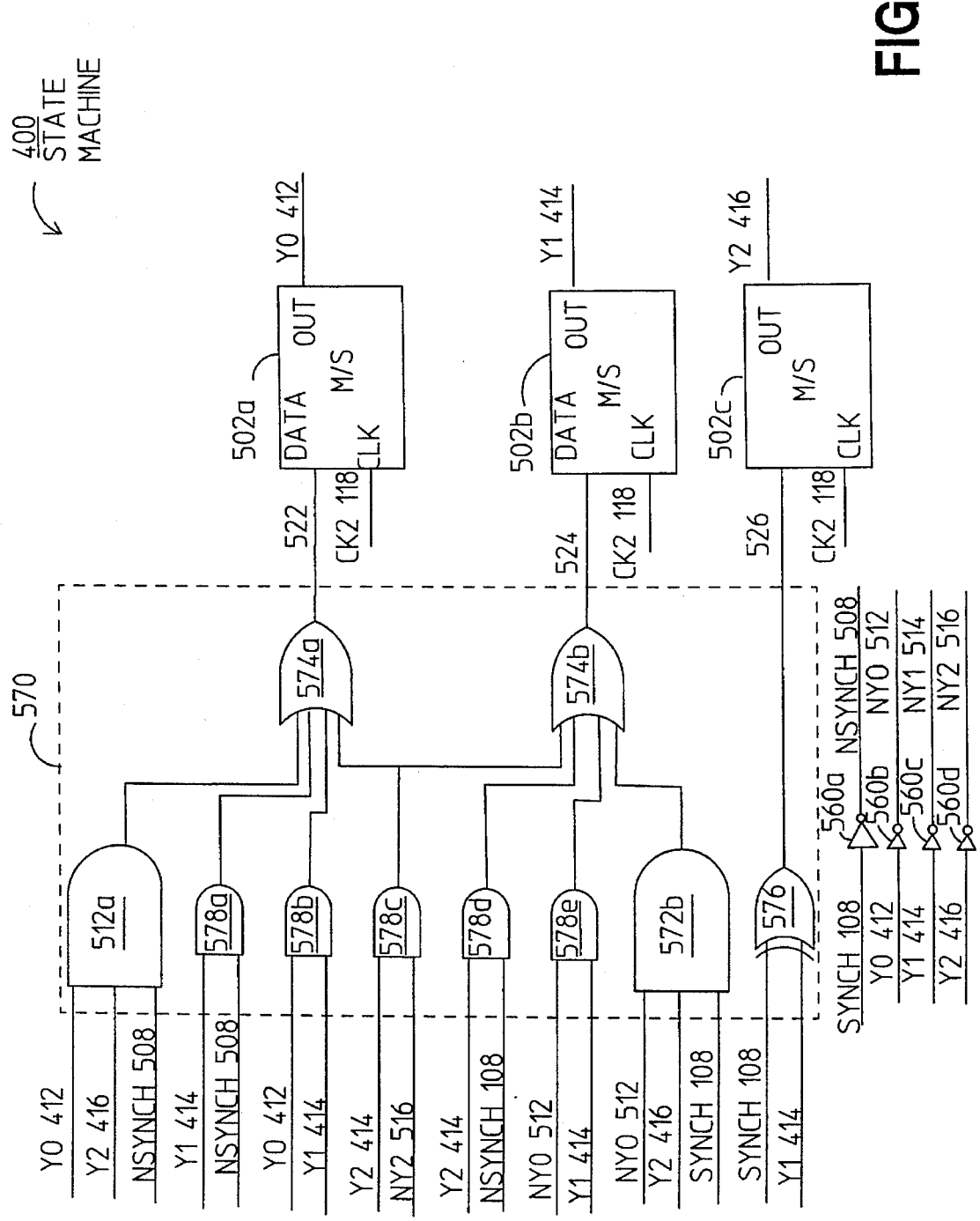
FIG. 5A is a logic diagram for the state machine section of a frequency ratio detector that can detect frequency ratios of 1:1, 2:1 and 3:2.

FIGS. 5A and B illustrate an implementation of the FRD 110, which operates according to the state machine diagram in FIG. 3. The FRD 110 consists of combinational and sequential logic components. It should be noted that the reduction of a state diagram to a logic circuit is generally a routine task for those skilled in the art. The task is generally analogous to the coding of a computer program from a flow chart.

FIG. 5A illustrates the state machine section 400 of the FRD 110. Inverter 560*a* inverts SYNCH 108 to generate NSYNCH 508. Three master/slave flip-flops 502*a*, 502*b* and 502*c* hold the state variable bits Y0 412, Y14 14, and. Y2 416 respectively. Master/slave type flip-flops are used for this purpose in order to avoid race conditions. Each master/slave flip-flop 502*a–c* is clocked by CK2 118, since changes in the FRD 110 state occur only on rising edges of CK2 118. It is assumed that each master/slave flip-flop 502*a–c* contains logic for generating an internal master clock and an internal slave clock, as is commonly the case.

Inverters 560*b–d* invert the state variable bits Y0 412, Y1 414 and Y2 416, to generate NY0 512, NY1 514, and NY2 516 respectively. Combinational logic 570 uses Y0 412, NY0 512, Y1 414, Y2 416, NY2 516, SYNCH 108, and NSYNCH 508 to generate the data inputs 522, 524, 526 to the master/slave flip-flops 502*a–c*. Thus, the combinational logic 570 determines the next state of the FRD 110 from the level of SYNCH 108 and the current state of the FRD 110.

Figure 5B:
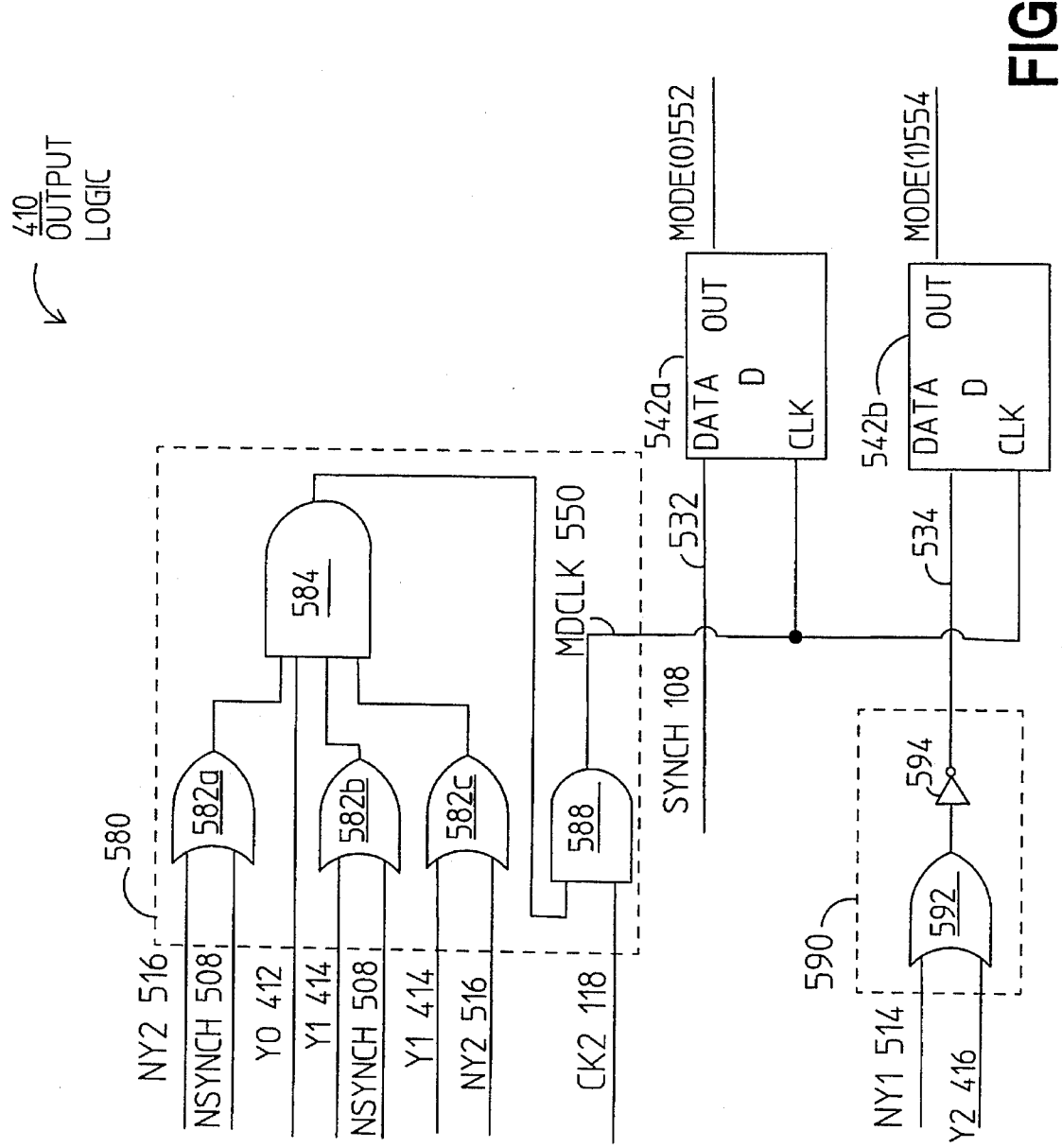
FIG. 5B is a logic diagram for the output logic section of a frequency ratio detector that can detect frequency ratios of 1:1, 2:1 and 3:2.

FIG. 5B illustrates the output logic section 4 10 of the FRD 110. Two D-type latches 542*a* and 542*b* hold MODE(0) 552 and MODE(1) 554, which are the most significant bit and the least significant bit of MODE 120 respectively. The Latch 542*a* which holds MODE(0) 552 uses SYNCH 108 as a data input 532. The Latch 542*b* which holds MODE(1) 554 has a data input 534 generated by combinational logic 590 from NY1 514 and Y2 416. Each D-type latch 542*a,b* is clocked by a signal MDCLK 550. MDCLK 550 is generated by combinational logic 580 from Y0 412, Y1 414, NY2 516, NSYNCH 508, and CK2 118. Thus, MODE(0) 552 and MODE(1) 554 are generated from the current state of the FRD 110, and the signals SYNCH 108 and CK2 118.

As discussed previously, MODE 120 is connected to the CPU 114, and is used to transmit to the CPU 114 the detected clock frequency ratio. The CPU 114 uses the detected clock frequency ratio to generate the appropriate timing signals for interfacing with hardware controlled by the secondary clock 106. Although the foregoing embodiment uses the FRD 110 to communicate a detected clock frequency ratio to a CPU 114, it is contemplated that the clock frequency ratio information indicated by MODE 120 can be transmitted to any component within the computer system which can use the information.

4. Alternate Embodiments

The FRD 110 can be designed, using the same methodology as described above, to detect clock frequency ratios other than 1:1, 3:2, and 2:1. Furthermore, the FRD 110 can be designed to detect other numbers of fixed clock frequency ratios. The specific embodiment will depend on the application in which the FRD 110 is to be used. For example, a computer system having a fixed 50 MHz CPU clock and a secondary clock which can have a frequency of 10 MHz, 20 MHz, 30 MHz or 40 MHz would require a FRD 110 that can detect clock frequency ratios of 5:1, 5:2, 5:3 and 5:4.

All embodiments of FRD 110 can operate by the same method regardless of the detectable clock frequency ratios. This method can be described generally by the following steps. First, a signal SYNCH 108 is generated by dividing the secondary clock 106 (gendrally the slower of the two clocks) by an integer N. N is selected such that the period of SYNCH 108 is an integer multiple of the CPU clock period for all expected frequency ratios. Second, the number of transitions of the CPU clock 104 (or a signal CK2 118 generated from the CPU clock 104) is counted while SYNCH 108 remains unchanged. Third, the counted number of transitions of the CPU clock 104 is translated into a value on MODE 120, indicating the clock frequency ratio.

This third step in the above method can always be carried out by describing the operation of the FRD 110 with a state machine diagram, and then reducing the state machine diagram to a logic circuit. Sequential logic elements can be used to store the MODE 120 bits and the current state of the FRD 110. Combinational logic elements can be used to determine the next state of the FRD 110 using SYNCH 108 and the current state. Combinational logic elements can also be used to update the MODE 120 bits on transitions between states. Alternatively, the FRD 110 state machine and output functionality can be implemented in a programmable logic array (PLA).

Although the foregoing has described the FRD 110 with reference to a CPU clock 104 and a secondary clock 106, the FRD 110 can be used with any two clocks having multiple, fixed frequency ratios. Additionally, it is contemplated that the FRD 110 can be designed to detect multiple frequency ratios for three or more clocks.

While a single embodiment of the present invention has been described in detail, it should be understood that it has been presented by way of example only, and not as a limitation. The breadth and scope of the present invention should not be limited by the described embodiment, but should be defined only in accordance with the following claims and their equivalents.

What is claimed is:

1. A method for determining a ratio between frequencies of a first clock and a second clock of a computer-based system, wherein the ratio is one of a plurality of fixed ratios, the method comprising the steps of:

(a) dividing the second clock by an integer N to generate a synchronization signal, wherein said integer N is such that a period of said synchronization signal is an integer multiple of a period of the first clock for each of the plurality of fixed ratios;

(b) counting a number of transitions of the first clock while said synchronization signal remains at a single logic level;

(c) determining the ratio between the frequencies of the first clock and the second clock from among the plurality of fixed ratios based on said number of transitions; and (d) generating an output signal indicative of the ratio between the frequencies of the first clock and the second clock.

2. A frequency ratio detector for detecting a ratio between frequencies of a first clock and a second clock, wherein the ratio is one of a plurality of fixed ratios, the frequency ratio detector comprising:

means for generating a synchronization signal, said synchronization signal having a frequency equal to the frequency of the second clock divided by an integer N, wherein said integer N is such that a period of said synchronization signal is an integer multiple of a period of the first clock for each of the plurality of fixed ratios;

means for counting a number of transitions of the first clock while said synchronization signal remains at a single logic level;

means for determining the ratio between the frequencies of the first clock and the second clock from among the plurality of fixed ratios based on said number of transitions; and means for generating a digital output value indicative of the ratio between the frequencies of the first clock and the second clock.

3. The frequency ratio detector of claim 2, wherein said means for generating a synchronization signal comprises a clock generator circuit.

4. The frequency ratio detector of claim 2, wherein said means for counting said number of transitions comprises a state machine logic circuit for determining a next state of the frequency ratio detector from a current state, said synchronization signal, and the first clock, and for storing said next state.

5. The frequency ratio detector of claim 4, wherein said means for generating a digital output value comprises an output logic circuit for determining said digital output value from said current state, said synchronization signal, and the first clock.

6. The frequency ratio detector of claim 2, wherein the plurality of fixed ratios comprises a ratio for which the frequency of the first clock is not an integer multiple of the frequency of the second clock.

7. The frequency ratio detector of claim 2, wherein the plurality of fixed ratios comprises first clock-to-second clock frequency ratios of 1:1, 3:2 and 2:1.

8. A computer system having a CPU clock to control a CPU, and a secondary clock to control devices connected to the CPU, the CPU clock and the secondary clock being switchable between a plurality of fixed clock frequency ratios, the computer system comprising: synchronization hardware, to synchronize the CPU with the devices connected to the CPU based on one of the plurality of fixed clock frequency ratios; and a frequency ratio detector coupled to said synchronization hardware, to detect said one of the plurality of fixed clock frequency ratios based on the CPU clock and the secondary clock, and to generate a digital signal for indicating to the CPU said one of the plurality of fixed clock frequency ratios detected, said frequency ratio detector including:

means for generating a synchronization signal, said synchronization signal having a frequency equal to the frequency of the second clock divided by an integer N, wherein said integer N is such that a period of said synchronization signal is an integer multiple of a period of the first clock for each of the plurality of fixed clock frequency ratios;

means for counting a number of transitions of the CPU clock while said synchronization signal remains at a single logic level, said number of transitions uniquely indicating said one of the plurality of fixed clock frequency ratios; and means for generating a digital output value representing said number of transitions counted.

9. The computer system of claim 8, wherein said plurality of fixed clock frequency ratios includes a clock frequency ratio for which the frequency of the CPU clock is not an integer multiple of the frequency of the secondary clock.

* * * * *